United States Patent
Vastardis et al.

(10) Patent No.: US 11,421,192 B2
(45) Date of Patent: *Aug. 23, 2022

(54) VACUUM INFUSION METHOD

(71) Applicant: BKON LLC, Newark, DE (US)

(72) Inventors: Dean J. Vastardis, Moorestown, NJ (US); Lou Vastardis, Moorestown, NJ (US)

(73) Assignee: BKON LLC, Newark, DE (US)

( * ) Notice: Subject to any disclaimer, the term of this patent is extended or adjusted under 35 U.S.C. 154(b) by 424 days.

This patent is subject to a terminal disclaimer.

(21) Appl. No.: 16/171,711

(22) Filed: Oct. 26, 2018

(65) Prior Publication Data

US 2019/0059409 A1    Feb. 28, 2019

Related U.S. Application Data

(63) Continuation of application No. 15/706,960, filed on Sep. 18, 2017, now Pat. No. 10,117,444, which is a
(Continued)

(51) Int. Cl.
*A23D 9/02* (2006.01)
*C12J 1/08* (2006.01)
(Continued)

(52) U.S. Cl.
CPC .................. *C12G 3/04* (2013.01); *A23D 9/02* (2013.01); *A23L 2/52* (2013.01); *A23L 2/56* (2013.01);
(Continued)

(58) Field of Classification Search
CPC ... C12G 3/04; A23L 33/10; A23L 2/52; A23L 2/56; A23D 9/02; A47J 31/002; A47J 31/043; C12J 1/08; A23V 2002/00
See application file for complete search history.

(56) References Cited

U.S. PATENT DOCUMENTS 1,674,857 A    6/1928   Emerson
1,751,477 A    3/1930   Greenwald
(Continued)

FOREIGN PATENT DOCUMENTS

DE    19706005    *    8/1998
JP    S59113847        6/1984
(Continued)

OTHER PUBLICATIONS

A Short History of Coffee. 2020. https://www.herbalremediesadvice.org/history-of-coffee.html.*
(Continued)

*Primary Examiner* — Anthony J Weier
(74) *Attorney, Agent, or Firm* — Riverside Law LLP

(57) ABSTRACT

A process for infusing a consumable substance is described. The process includes the steps of placing a desired amount of an infusion material into a chamber at atmospheric pressure, placing a desired amount of consumable substance into said chamber, sealing said chamber from the surrounding atmosphere, and applying at least one reduced pressure cycle within said chamber. Methods for separating the infusion material from the consumable substance after completion of the infusion process are also described. In addition, devices for infusing liquids or consumable substances, and/or brewing beverages are described.

15 Claims, 5 Drawing Sheets

Related U.S. Application Data continuation of application No. 14/499,924, filed on Sep. 29, 2014, now Pat. No. 9,763,461, which is a continuation-in-part of application No. 14/083,016, filed on Nov. 18, 2013, now Pat. No. 9,402,405, which is a continuation of application No. 13/749,411, filed on Jan. 24, 2013, now Pat. No. 8,586,117, which is a continuation-in-part of application No. 12/589,784, filed on Oct. 28, 2009, now Pat. No. 8,383,180.

(51) Int. Cl.
| | | |
|---|---|---|
| C12G 3/04 | (2019.01) | |
| A23L 2/56 | (2006.01) | |
| A47J 31/00 | (2006.01) | |
| A47J 31/043 | (2006.01) | |
| A23L 33/10 | (2016.01) | |
| A23L 2/52 | (2006.01) | |

(52) U.S. Cl.
CPC ............ *A23L 33/10* (2016.08); *A47J 31/002* (2013.01); *C12J 1/08* (2013.01); *A23V 2002/00* (2013.01); *A47J 31/043* (2013.01)

(56) References Cited

U.S. PATENT DOCUMENTS

| | | | |
|---|---|---|---|
| 1,947,426 A | 2/1934 | Smith | |
| 1,952,733 A | 3/1934 | Smith | |
| 1,980,735 A | 11/1934 | Smith | |
| 2,079,603 A | 5/1937 | Davis | |
| 2,181,090 A | 11/1939 | Lucia | |
| 2,203,638 A | 6/1940 | Smaltz | |
| 2,212,100 A | 8/1940 | Keaton | |
| 2,218,475 A | 10/1940 | Musher | |
| 2,223,450 A | 12/1940 | Jepson | |
| 2,232,614 A | 2/1941 | Kopf | |
| 2,289,498 A | 7/1942 | Hons, Jr. | |
| 2,312,555 A | 3/1943 | Jepson | |
| 2,338,140 A | 1/1944 | States | |
| 2,403,404 A | 7/1946 | Scott | |
| 2,467,817 A | 4/1949 | Dietz | |
| 2,571,867 A | 10/1951 | Hall | |
| 2,708,398 A | 5/1955 | Mertler | |
| 2,845,018 A | 7/1958 | Turke, Sr. | |
| 2,885,294 A | 5/1959 | Gerhard | |
| 3,181,951 A | 5/1965 | Gronvold | |
| 3,478,672 A | 11/1969 | Fuqua | |
| 3,860,731 A | 1/1975 | Forkner | |
| 4,681,769 A | 7/1987 | Bennett, III | |
| 4,882,982 A | 11/1989 | Muttoni | |
| 4,967,647 A | 11/1990 | King | |
| 5,338,409 A | 8/1994 | Heierli | |
| 5,503,810 A * | 4/1996 | Chang .................... | A61K 36/00 422/235 |
| 5,773,067 A | 6/1998 | Freychet | |
| 5,878,654 A | 3/1999 | Kobayashi | |
| 6,019,034 A | 2/2000 | Ford, Sr. | |
| 6,068,160 A | 5/2000 | Fancher | |
| 6,295,920 B1 | 10/2001 | Barden | |
| 6,578,467 B1 | 6/2003 | Taylor | |
| 6,629,490 B1 | 10/2003 | Lu | |
| 6,711,988 B1 | 3/2004 | Eugster | |
| 6,817,280 B2 | 11/2004 | Hall | |
| 7,032,507 B2 | 4/2006 | Cai | |
| 7,832,329 B2 | 11/2010 | Crescenzi | |
| 8,383,180 B2 | 2/2013 | Vastardis | |
| 8,586,117 B2 | 11/2013 | Vastardis | |
| 8,613,402 B2 | 12/2013 | Lefkovitz | |
| 9,295,358 B2 | 3/2016 | Vastardis | |
| 9,402,405 B2 | 8/2016 | Vastardis | |
| 9,763,461 B2 | 9/2017 | Vastardis | |
| 9,907,430 B2 | 3/2018 | Vastardis | |
| 10,117,444 B2 * | 11/2018 | Vastardis .................. | A23L 2/56 |
| 11,116,354 B2 * | 9/2021 | Vastardis ................ | A47J 31/44 |
| 2003/0101873 A1 | 6/2003 | Kerr | |
| 2004/0118290 A1 | 6/2004 | Cai | |
| 2004/0206245 A1 | 10/2004 | Halliday | |
| 2007/0186780 A1 | 8/2007 | Clark | |
| 2008/0121112 A1 | 5/2008 | Dworzak | |
| 2008/0138446 A1 | 6/2008 | Hilterman | |
| 2008/0212403 A1 | 9/2008 | Garman | |
| 2009/0165655 A1 | 7/2009 | Aonuma | |
| 2009/0173237 A1 | 7/2009 | Chen | |
| 2009/0297671 A1 | 12/2009 | Basker | |
| 2010/0255163 A1 | 10/2010 | Anand | |
| 2010/0278988 A1 | 11/2010 | Radosav | |
| 2011/0097466 A1 | 4/2011 | Vastardis | |
| 2011/0151071 A1 | 6/2011 | Ablett | |
| 2011/0226343 A1 | 9/2011 | Novak | |
| 2012/0070542 A1 | 3/2012 | Camera | |
| 2012/0093990 A1 | 4/2012 | Shrader | |
| 2012/0100275 A1 | 4/2012 | Bishop | |
| 2012/0219686 A1 | 8/2012 | Bombeck | |
| 2013/0136833 A1 | 5/2013 | Vastardis | |
| 2014/0079854 A1 | 3/2014 | Vastardis | |
| 2014/0120213 A1 | 5/2014 | Miller | |
| 2014/0127383 A1 | 5/2014 | Ponkratov | |
| 2014/0314921 A1 | 10/2014 | Kuempel | |

FOREIGN PATENT DOCUMENTS

| | | |
|---|---|---|
| JP | S61112295 | 5/1986 |
| JP | H03155747 | 7/1991 |
| JP | H03083088 | 8/1991 |
| JP | H0529445 B | 4/1993 |
| JP | H0622691 A | 2/1994 |
| JP | H0678678 A | 3/1994 |
| JP | H06507067 A | 8/1994 |
| JP | 2797442 B2 | 9/1998 |
| JP | 2001275842 | 10/2001 |
| JP | 2007223672 | 9/2007 |
| JP | 2008178507 | 8/2008 |
| SU | 449708 A1 | 11/1974 |
| WO | 9212644 A1 | 8/1992 |
| WO | 2009086613 | 7/2009 |
| WO | 2010059251 A1 | 5/2010 |

OTHER PUBLICATIONS

English translation for DE19706005 published Aug. 1998.*
Notice of Allowance dated Jan. 12, 2018 for U.S. Appl. No. 15/080,671; (pp. 1-5).
Office Action dated Sep. 27, 2018 for U.S. Appl. No. 13/749,436 (pp. 1-14).

* cited by examiner

VACUUM INFUSION METHOD

CROSS-REFERENCE TO RELATED APPLICATIONS

The present application is a continuation of U.S. patent application Ser. No. 15/706,960, filed Sep. 18, 2017, issued as U.S. Pat. No. 10,117,444, which is a continuation of U.S. patent application Ser. No. 14/499,924, filed Sep. 29, 2014, issued as U.S. Pat. No. 9,763,461, which is a continuation-in-part of U.S. patent application Ser. No. 14/083,016, filed Nov. 18, 2013, issued as U.S. Pat. No. 9,402,405, which is a continuation of U.S. patent application Ser. No. 13/749,411, filed Jan. 24, 2013, issued as U.S. Pat. No. 8,586,117, and also claims priority to U.S. patent application Ser. No. 13/749,429, filed Jan. 24, 2013, both of which are continuation-in-part applications of U.S. application Ser. No. 12/589,784, filed Oct. 28, 2009, issued as U.S. Pat. No. 8,383,180, all of which are herein incorporated by reference in their entirety.

FIELD OF THE INVENTION

The present invention relates to an infusion machine, and, more particularly, to systems and methods of vacuum brewed or infused consumable substance.

BACKGROUND OF THE INVENTION

Brewed beverages, such as coffee or tea, are very popular and common among many types of people in various cultures and in numerous countries around the world. Getting the best quality brew in the most efficient manner has been the goal of many coffee and tea brewers for many years.

Over the last two decades the coffee and tea industry has evolved from a commodity based industry to one of specialty products, retail outlets and consumer driven increase of quality and cost. Starbucks Corporation sparked the evolution within the industry in the United States resulting in retail concept and beverage concept innovation, the birth of the US style "Cafe Culture" and consumer demand for better quality coffee products. However, this entire evolution of the coffee industry was built on the methods and technologies developed over 80 years ago.

The French press was invented in the 1850's. The espresso machine was created in 1822. Emerson's vacuum brewer was invented in 1922. Melitta Bentz's coffee filters were invented in 1908. There have been numerous modifications, improvements and automations to these processes and apparatuses over the years. However, despite the explosion of beverage and retail innovation over the last two decades not one significant new brewing/infusing process has emerged.

In 2006 The Coffee Equipment Company launched "the Clover", which is an automated French press, capable of making a hot beverage in less than 60 seconds. The apparatus proved that there is a need for single serving, quick turn over and created a niche in the industry where ultra premium coffees could now be brewed and served by the cup in an acceptable retail turnover rate. The Coffee Equipment Company was soon recognized for their "Clover" by Starbucks and was purchased in 2008. The purchase created a void in the market for a single serving brewer capable of creating ultra premium drinks in under 60 seconds.

The "cold brewing" of coffee and tea has also been practiced for countless years in countries around the world. This process involves the soaking and or brewing/infusing of coffee or tea with room temperature water in a vessel for 12 to 24 hours. This process is considered by many as the optimal method to extracting the right solid from the dried media. However, the process takes too much time for the typical consumer.

The niche created by the "Clover" and the "cold brewing" method became the inspiration for the development of the inventive process and apparatus described herein. The goal was to create a process that could be versatile enough to be used to brew both coffee and tea, as well as to brew using both with hot and cold water. The invention is a completely new and unique process which does not adhere to any of the restrictions or methods of anything that has ever existed. The process, which brews in a vacuum environment, has tremendous range in all the parameters and can be utilized to brew as quickly or slowly, as hot or as cold as desired in less time then conventional methods allow.

The term "vacuum" has been used in the past in connection with the brewing of coffee. For example, in 1922 Emerson was issued U.S. Pat. No. 1,674,857 for a "vacuum" brewing process. This conventional process involves an upper and lower vessel. The lower vessel holds water and is placed above a heat source. The upper vessel holds the dried media or coffee. The upper vessel, resembling a funnel with a long neck, sits atop the lower vessel. The long stem from the upper vessel goes down into the lower vessel below the water level. The two are connected via an airtight seal at the top of the lower vessel and the beginning of the neck for the upper.

When the water is heated it rises through the tube into the upper vessel and saturates the dried media in the funnel of the upper vessel. Once the heat is removed a "vacuum" occurs in the lower vessel as the water vapor contracts as it cools. The resulting vacuum creates a suction which pulls the liquid from the upper vessel back down to the lower vessel. Therefore, the "vacuum" acts as a mechanism to create extract or to suck the liquid through the coffee and filter in order to separate the two. There is no point where the coffee or dried media brew inside a vacuum during the process defined by Emerson. Similar systems are shown in U.S. Pat. No. 6,295,920 to Barden et al. and U.S. Pat. No. 2,467,817 to Dietz.

Automated "vacuum" brewers such as Starbucks's "Clover" operate under the same principal of brewing under normal atmospheric conditions while using suction/vacuum pressure below a filter as a mechanism to separate liquid from solids. There is no suggestion of brewing the water and dried media completely inside a vacuum chamber while negative pressure is occurring.

In 1935 Davis was granted U.S. Pat. No. 2,079,603 that describes a coffee maker wherein a "vacuum" is partially created to aid as a mechanism to create movement within the brewing apparatus. During the brewing process the heating of the water creates steam pressure which actually suspends the upper vessel like a hot air balloon above a steaming pot of water. When the heat is removed the steam pressure cools thus creating a vacuum, allowing the upper vessel, with dried media (coffee) to descend into the hot water. When the vacuum has pulled all available water inside the vessel, outside air is pulled in through the open spouts through the coffee creating a bubbling action.

The liquid in the Davis system is not boiling or bubbling due to a lack of surface pressure, but is bubbling due to the air which is getting pulled in through available vents into the process chamber. Since the entire apparatus is not sealed there is no possibility for the brewing to occur in a stabilized vacuum. Nor is there any mention of the brewing process occurring in a vacuum.

Although coffee, tea and other beverages have not previously been brewed in a vacuum, it has been suggested to use a vacuum to cook other food products. For example, in 1940 Smaltz was granted U.S. Pat. No. 2,203,638 for a "Vacuum Cooking and Cooling" process for the processing of pie fillings, fruit preserves or the similar food products. According to the patent, a vacuum is pulled until all evaporation is complete. This is achieved by continuously running the vacuum pump and expelling the vacated vapor and air while the vacuum component of the process is being applied. There are no one way valves or manual valves that would allow for the vacuum to be regulated at anything other than the maximum capacity of the pump which is −29 Hg in.

As the Smaltz patent states, 29 inches of mercury vacuum will cause the pie filling to rapidly cool thereby halting the cooking process while allowing the product to cool rapidly without separating. He mentions that the vacuum/cooling process is a part of the process to reach a final finished product, whereas the removal of water vapors and temperature is defined as part of the "cooking" and "cooling" process. Cooking is defined as preparing under the application of heat. Therefore, Smaltz is only cooling with a vacuum, not cooking and there is no suggestion therein that his process can be used to brew coffee or tea or other beverage.

U.S. Pat. No. 2,885,294 issued to Larson in 1959 for an invention entitled "Oven and Method of Preparing Food". The patent describes the beginning of the cooking process where a super atmospheric cycle or a "downward displacement" method are utilized to remove ambient air, which is replaced by steam pressure to cook the foodstuff quickly, without contaminants and without "impregnating" or saturating the interior of the foodstuff with water molecules. The ambient air is removed to prevent the loss of vitamins or nutritional elements as well as to avoid the "impregnation" and or saturation of the foodstuff with water molecules during the cooking process.

Larson mentions using a vacuum pump in the beginning of the cooking process for the sole reason of removing ambient air. This void is then filled with the expanding gasses of steam which is heated further by the heated walls of the oven, thus resulting in a positive pressure atmosphere. The cooking, therefore, does not actually take place in a vacuum. Furthermore, there is no suggestion in Larson that his process can be used to brew coffee or tea.

A need clearly exists for a beverage brewing machine and process that can provide a quick and efficient method for brewing or infusing a high quality consumable substance, such as beverages or other types of food products, including fats, oils, and vinegars. The present invention satisfies this need.

SUMMARY

The present invention relates to methods and devices for brewing or infusing consumable substances, such as beverages, vinegars, fats, oils, and other food products with at least one infusion material. In various embodiments, the at least one infusion material can include any material that can be used to impart a flavor to a consumable substance, including, but not limited to, herbs, botanicals, glucose or other sugar, and the like. In one embodiment, the present invention relates to a liquid infusion process, comprising placing a desired amount of an infusion material into a chamber at atmospheric pressure; placing a desired amount of liquid into said chamber; sealing said chamber from the surrounding atmosphere; and applying at least one reduced pressure cycle within said chamber, wherein said at least one cycle comprises reducing pressure within said chamber to form at least a partial vacuum within said chamber and subsequently returning said chamber to about atmospheric pressure.

In another embodiment, the present invention relates to a method of brewing a beverage or infusing a consumable substance, comprising combining at least one brewing or infusion material and a consumable substance within a sealed chamber; applying a plurality of reduced pressure cycles within said chamber, wherein each of said cycles comprises reducing pressure within said chamber to form at least a partial vacuum within said chamber and subsequently returning said chamber to about atmospheric pressure; and removing at least a portion of said brewing or infusion material from said liquid to form said beverage In various embodiments of the present invention, the consumable substance may be placed into the chamber at substantially the same time as the application of a reduced pressure cycle, or the placement of the consumable substance into the chamber may alternate with the reduced pressure cycles. The alternating cycles of reduced pressure and placement of consumable substance may increase agitation of the infusion material. Further, the application of a reduced pressure cycle prior to the first placement of consumable substance in the chamber may increase the rate of infusion when the consumable substance is subsequently placed into the chamber. In one embodiment, the vacuum source of the present invention comprises a venturi pump.

A range of temperatures, pressures, and times may be used for the processes of the present invention. The vacuum within the chamber may be maintained in the range of about −2 to −20 inches of mercury (Hg in) during a brew/infusion cycle. The chamber may be held at reduced pressure for at least 3 seconds within each cycle. Further, the depth of vacuum used may be variable, i.e., for each reduced pressure cycle the vacuum within the chamber may be higher or lower than the vacuum within the chamber for the previous reduced pressure cycle. The consumable substance may be in the range of about 70° (i.e., room temperature) to about 212° F. when it is placed into the chamber. Alternatively, the consumable substance may be heated to within a range of about 185° to about 212° F. after it is placed into said chamber. In various embodiments, the temperature of the consumable substance during a reduced pressure cycle may be at, above, or below room temperature.

In another embodiment, the consumable substance infusion process of the present invention comprises: placing a desired amount of an infusion material into a chamber; placing a desired amount of consumable substance into said chamber; and applying at least one pressure cycle within said chamber, wherein said at least one cycle comprises reducing pressure within said chamber to a first pressure and subsequently adjusting pressure within said chamber to a second pressure.

In another embodiment, the liquid infusion process of the present invention comprises: placing a pod comprising an infusion material into a chamber; placing a desired amount of consumable substance into said chamber; sealing said chamber from the surrounding atmosphere; and applying at least one reduced pressure cycle within said chamber, wherein said at least one cycle comprises reducing pressure within said chamber to a first pressure and subsequently raising pressure within said chamber to a second pressure.

In yet another embodiment, the liquid infusion process of the present invention comprises: connecting a pod comprising an infusion material to a chamber, wherein an opening in said pod is in communication with an opening in said chamber; placing a desired amount of consumable substance into said chamber and/or said pod; sealing said chamber and said pod from the surrounding atmosphere; and applying at least one reduced pressure cycle within said chamber and said pod, wherein said at least one cycle comprises reducing pressure within said chamber and said pod to a first pressure and subsequently raising pressure within said chamber and said pod to a second pressure.

In one embodiment, the infusion process further comprises removing said pod from said chamber. In one embodiment, the infusion process further comprising removing infused consumable substance from said chamber and/or said pod. In one embodiment, the infused consumable substance is substantially free of the infusion material. In one embodiment, the infused consumable substance is removed from said chamber and/or said pod via a second opening in said pod In one embodiment, the first pressure of the infusion process is in the range of about −2 to-about −29 inches of mercury. In one embodiment, the second pressure is atmospheric pressure. In another embodiment, the second pressure is in the range of about −2 to-about −29 inches of mercury. In one embodiment, the infusion process of the present invention further comprises adjusting pressure within said chamber to a third pressure. In one embodiment of such a process, the third pressure is atmospheric pressure. In another embodiment of such a process, the third pressure is in the range of about −2 to-about −29 inches of mercury.

In various embodiments, the infusion material can be placed into the chamber at atmospheric pressure; placed into the chamber at a pressure less than atmospheric pressure; or at a pressure greater than atmospheric pressure. In various embodiments, the consumable substance can be placed into the chamber at atmospheric pressure; placed into the chamber at a pressure less than atmospheric pressure; or at a pressure greater than atmospheric pressure. In various embodiments, the chamber is sealed from the surrounding atmosphere prior to placing the infusion material into said chamber, after placing the infusion material into said chamber, or after placing the consumable substance into said chamber.

In one embodiment of the infusion process of the present invention, the consumable substance is heated prior to placing the consumable substance into said chamber. In another embodiment, the consumable substance is heated to at least 75° F. prior to being placed in said chamber. In yet another embodiment, the consumable substance is heated to the range of about 150° F. to about 250° F. prior to being placed in said chamber. In one embodiment, the consumable substance is maintained within a temperature range of about 150° F. to about 250° F. during said at least one pressure cycle. In one embodiment, the consumable substance can be heated to significantly higher temperatures than 250° F., for example when an oil or fat with a relatively high boiling point is being infused. In one embodiment, the consumable substance is maintained within a temperature range of about 150° F. to about 350° F. during said at least one pressure cycle. In another embodiment, the consumable substance is maintained within a temperature range of about 70° F. to about 350° F. during said at least one pressure cycle.

In one embodiment, of the infusion process of the present invention, at least one additional desired amount of consumable substance is placed into said chamber during or after said at least one pressure cycle. In one embodiment, at least a portion of the at least one additional desired amount of consumable substance is applied via a spray.

In various embodiments, the processes or methods of the present invention may further comprise a step for substantially separating the infused consumable substance from the infusion material. This step may also comprise applying positive pressure to the chamber during the separation of the infused consumable substance from the infusion material. This step may be a filtration step that is performed using a filter, and may also be automated. In one embodiment, water vapor is used to apply positive pressure to the chamber.

In various embodiments of the infusion process of the present invention, the pressure is reduced within the chamber via a venturi pump. In one embodiment, water vapor is used to preheat the chamber. In one embodiment, the infusion process further comprises removing infused consumable substance from the chamber. In one embodiment, the infused consumable substance is substantially free of the infusion material.

The methods of the present invention may comprise additional steps. The method may comprise adding a gas, such as carbon dioxide ($CO_2$), to the consumable substance or to the chamber. The gas may be added to the chamber during at least one of the reduced pressure cycles. The method may also comprise rinse or wash steps applied before, during, or after an infusion cycle. For instance, a rinse cycle may be applied during or after an infusion cycle, such that residual infusion material is substantially removed from at least a portion of the chamber. The addition of a rinse cycle after a reduced pressure cycle may rinse suspended infusion material. A liquid wash cycle may be also applied prior to an infusion cycle for the purpose of cleaning the chamber or other portion of the device prior to use. Further, a liquid rinse or wash may be applied via a spray.

The infusion process of the present invention may involve a variety of consumable substances and infusion materials. For instance, the consumable substance may comprise water or ethanol. In one embodiment, the consumable substance can be a liquid, such as a cooking oil or a type of vinegar. In another embodiment, the consumable substance can comprise a solid material. In such an embodiment, the solid material can be melted at some point during the infusion process. In one embodiment, the consumable substance comprises a fat. The infusion material may, for example, comprise fruit, herbs, or botanicals.

In one embodiment, the present invention relates to an apparatus for brewing beverages comprising a vessel, said vessel comprising a sealable chamber for holding a brewing material and a liquid, and a filter assembly connected to the sealable chamber; a liquid supply and conduit for introducing at least a portion of said liquid supply into said sealable chamber; and a vacuum source and conduit for reducing pressure in said sealable chamber. The lower portion of the sealable chamber of the apparatus may be removably attached to an upper portion of the sealable chamber, and the filter assembly may be connected to the lower portion of the sealable chamber. The vacuum source of the present invention may comprise a venturi pump.

In another embodiment, the present invention relates to a device for infusing consumable substances, comprising a vessel having a sealable chamber for holding an infusion material and a consumable substance; a liquid supply and conduit for introducing at least a portion of said liquid supply into said sealable chamber; and a vacuum source and conduit for reducing pressure in said sealable chamber, wherein said vacuum source comprises a first container containing a gas supply, a second container for receiving the gas from said first container via said conduit, and a valve positioned within said conduit, such that said sealable chamber is connected to said vacuum source via said valve. The second container may be separately connected to the chamber by a second conduit. The valve may be a venturi valve. In one embodiment, the pressure within the sealable chamber is reduced when the gas in the first container is transferred to the second container via the venturi valve. In another embodiment, the gas is delivered from said second container into said sealable container.

In various embodiments, the apparatus or device of the present invention may comprise a filter assembly. The filter assembly may comprise a filter mechanism and a port through which consumable substance can be removed from the sealable chamber, and may also comprise a valve. Further, the filter mechanism may comprise filter paper or a mesh comprised of metal, plastic, or some other suitable material. In one embodiment, at least a portion of the infusion material is separated from the infused consumable substance when the infused consumable substance is forced through the filter assembly of the present invention.

The apparatus of the present invention may further comprise additional components in various embodiments. The apparatus may comprise a heat source for heating the consumable substance or liquid supply prior to or after the introduction of the consumable substance or liquid to the sealable chamber. The apparatus may also comprise a gas source and a conduit for introducing a gas, such as carbon dioxide ($CO_2$), from the gas source into the sealable chamber or other portion of the apparatus.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

DETAILED DESCRIPTION

Definitions

Figure 1A:
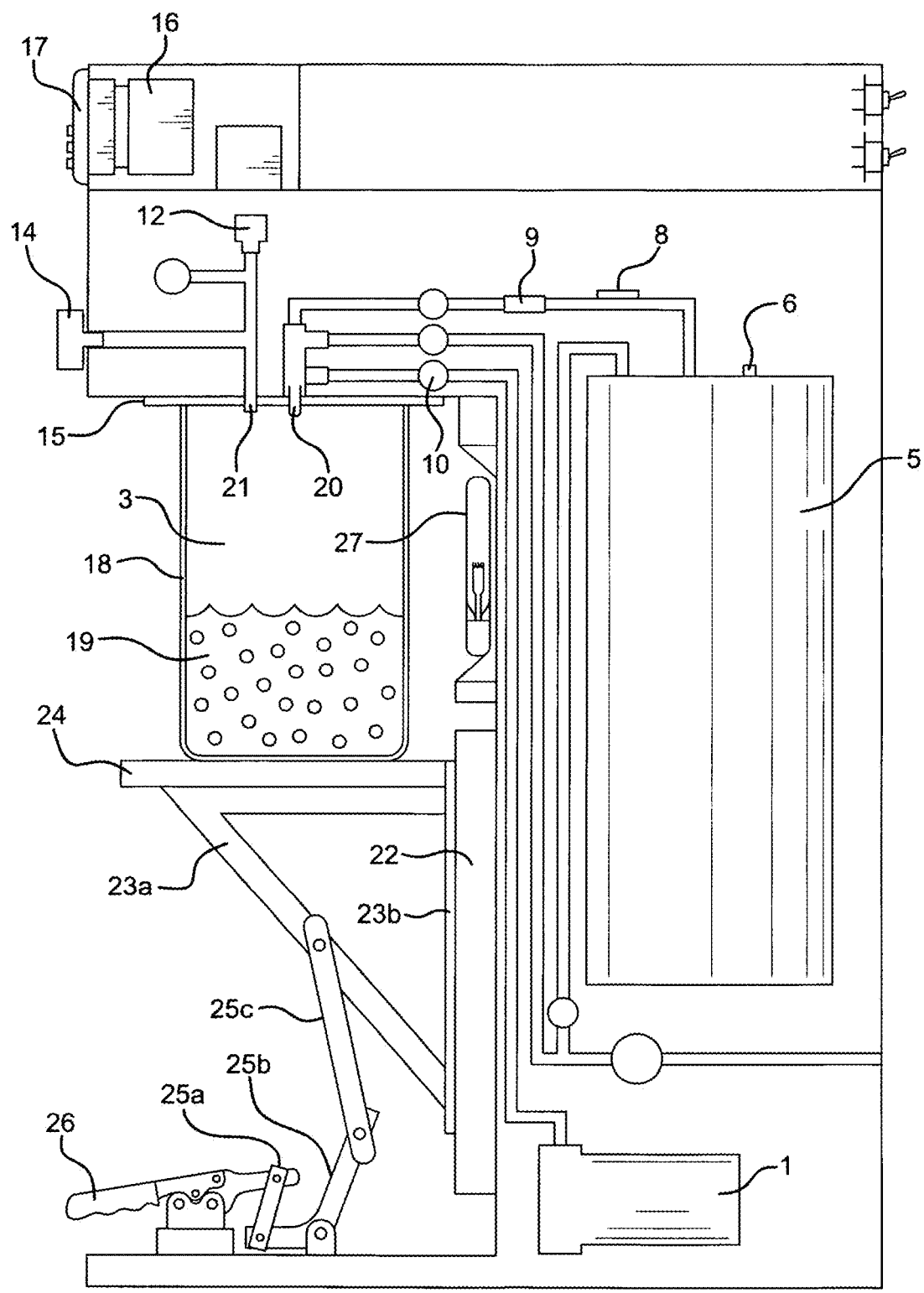
FIGS. 1A and 1B are schematic representations of a beverage brewing or infusing machine illustrating features of the present invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

The term "beverage" as used herein refers to any consumable liquid or drink, and can include, but is not limited to, water, tea, coffee, juice, milk, soda, alcoholic liquids (i.e., liquids containing ethanol) and any other water or alcohol based consumable solution or combination thereof. The term "spirit" as used herein refers to distilled beverages or liquors, such as vodka or gin, and may also refer to undistilled fermented liquids, such as beer, wine, and cider. Beverages may also include any amount of solid phase particulates, such as infusion or brewing materials, as well as trapped or infused gaseous materials.

The terms "infusion material," "brew material," "brewing material," "beverage making material" and the like are used interchangeably herein, and refer to any substance at least a portion of which is extracted into or is permeated by a consumable substance during a brewing or infusion step of the present invention. Examples of such a substance include, but are not limited to: coffee beans or grinds, tea leaves, cocoa, fruit, grains, herbs, spices, seasonings, botanicals, vegetables, wood chips, flavor additives, sweeteners, such as glucose, other sugars, artificial sweeteners, or any other material(s) suitable for consumption that can be used to impart a flavor to a consumable substance. Furthermore, the infusion materials of the present invention can be used fresh or dried (for instance, in the example of fruit, or another type of plant material, such as garlic); ground or whole (for instance, in the example of coffee beans); or, in general, can be processed or unprocessed prior to use in a brewing or infusion step of the present invention. There are no limitations to the size of infusion or brewing material components, in whole or particulate form, when used with the present invention. In one embodiment, the infusion material of the present invention can be a material that is readily dissolvable in the consumable substance to be infused, for example, salt or sugar, which are readily dissolvable in water or other liquids. Further, the infusion material can include non-solid materials. For example, the infusion material can be a liquid or syrup, such as "simple syrup," or any type of juice or flavoring.

The terms "consumable substance," "food product," "consumable product," "consumable material," "infused liquid," "liquid for infusion," and the like are used interchangeably herein and refer to any material suitable for being infused with an infusion material. The consumable substance can be any edible material or mixture of edible materials, including, but not limited to oils, fats, vinegars, sauces, marinades, dressings, juices, meats, and the like. It is contemplated that the consumable substances useful for the infusion process of the present invention are not limited to any embodiments specifically noted herein, and can comprise any edible gas, liquid, or solid, or a mixture thereof.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

It is to be understood that the figures and descriptions of the present invention have been simplified to illustrate elements that are relevant for a clear understanding of the present invention, while eliminating, for the purpose of clarity, many other elements found in typical brewing or infusion processes, hardware appliance, and software controlled appliance, apparatuses, systems, and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to the disclosed elements and methods known to those skilled in the art.

Described embodiments of these platforms, engines, systems and methods are intended to be exemplary and not limiting. Reference will now be made in detail to various exemplary and illustrative embodiments of the present invention.

Referring now to the drawings, there is shown in FIG. 1A a schematic representation of a beverage brewing or infusion machine constructed in accordance with the principles of the present invention. The entire process for brewing/infusing a consumable substance with dried media such as coffee, tea or herbs, or any other type of infusion material, in accordance with the invention, takes place inside a sealed vacuum chamber 3. This chamber 3 may comprise but is not limited to, a vessel 18 as the main body of the vacuum chamber, wherein the hot or cold water, or other consumable substance, and the dried media or other infusion material 19 will remain throughout the process. A seal may be created by a top or lid 15 with a gasket of silicone or a similar material to create the airtight seal between the vessel 18 and the lid 15. The lid 15 may have one or more ports, such as shown at 20 and 21, which may be utilized for evacuation of atmosphere, pressure transducers/sensors/switches, gauges, and/or for directing water into the chamber.

Means are also provided for applying pressure between the lid 15 and the vessel 18 to insure that the gasket creates a proper seal. This is accomplished through the use of a lift table having a table surface 24 on which the vessel 18 is placed. The table surface 24 is supported by a frame comprised of an angle bracket 23a and a vertical bracket 23b. The vertical bracket 23b slides in a fixed linear slide support 22 and can be moved up and down through the movement of adjustable arms 25a, 25b and 25c. A hold down clamp 26 holds the table surface 24 with the vessel 18 placed thereon in the upper sealed position as seen the FIG. 1A. The foregoing is, of course, by way of example only. The lift or pressure to achieve a proper seal may be created with the use of many other available lifting mechanisms such as hydraulic or pneumatic pistons, gas springs, screws, pulleys, latches, clamps or twist lock systems known in the art. As should also be readily apparent to those skilled in the art, in lieu of holding the lid 15 still and moving the vessel 18, one could hold the vessel 18 fixed and move the lid downwardly to create a seal or both could move toward the other.

Figure 1B:
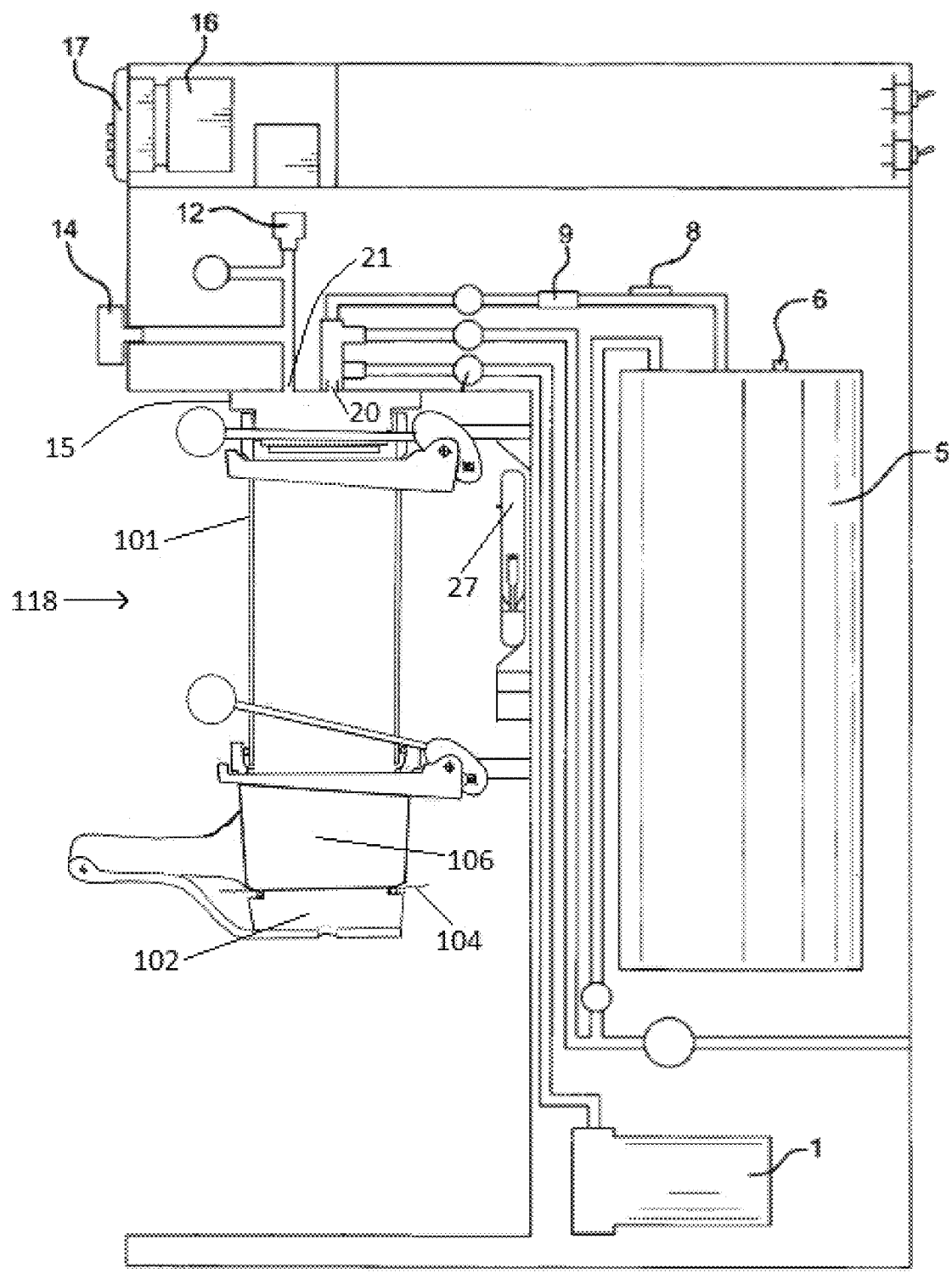
Figure 3:
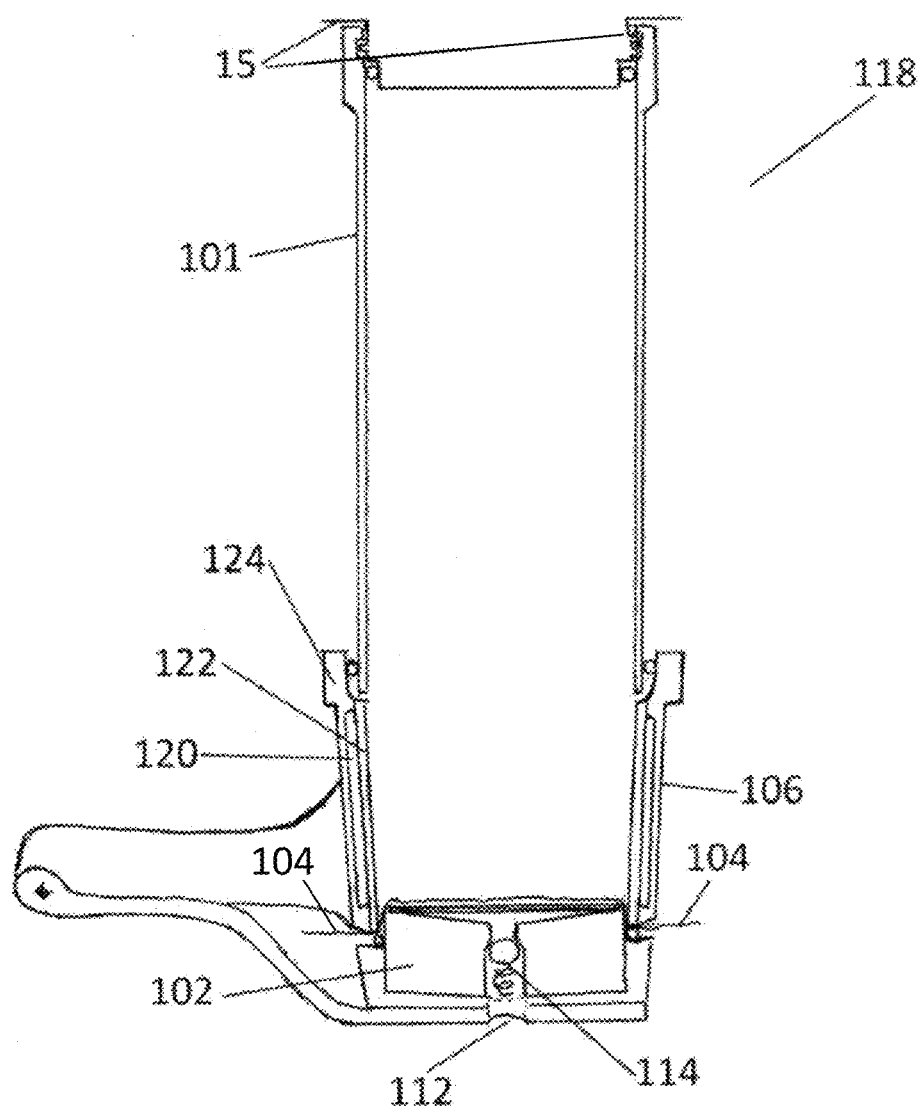
FIG. 3 is a schematic representation of another portion of a beverage brewing or infusing machine illustrating features of an embodiment of the invention.

In other embodiments of the present invention, a brew or infusion chamber assembly is used instead of a vessel 18 as the main body of the vacuum chamber. Referring to FIG. 1B, one embodiment of a chamber assembly 118 is shown, in which chamber assembly 118 is be separated into three primary assemblies. The upper chamber 101 communicates with the lower chamber 106, which in turn communicates with the filter assembly 102. Furthermore, upper chamber 101 communicates with lid 15. Similarly, referring to FIG. 3, one embodiment of a chamber assembly 118 is shown, in which chamber assembly 118 may be separated into three primary assemblies. The upper chamber 101 communicates with the lower chamber 106, which in turn communicates with the filter assembly 102. Furthermore, upper chamber 101 communicates with lid 15.

In the exemplary embodiment of FIG. 1B, and as discussed throughout, the brewing methodologies referenced herein may provide beverages brewed with tea leaves, coffee grinds, or other insoluble, and generally not ingestible, materials. In another embodiment, the infusion process described herein may provide an infused consumable substance having infusion materials or particulates that are undesirable in a consumable product. In order to provide a beverage or consumable product free of insoluble materials stemming from brew or infusion media that may include fine particles, a paper-like filter may be used for each brew cycle, or across more than one brew cycle. For example, a paper filter 104 may be placed between the bottom edge of the lower chamber 106 and the filter assembly 102 where a seal with the use of gasket may be created.

Upon completion of the brewing or infusion process, which as demonstrated herein may include at least one and preferably a plurality of reduced pressure cycles, paper filter 104 (and, thereby, the remaining undissolved elements) may be removed and discarded. Of course, the removal and discard may be performed manually or may be automated.

Additionally, filter assembly 102 may separate at least a portion of the brewing or infusion material from a liquid material, i.e., a beverage or consumable substance, during the final dispense of the brewing or infusion process, and may allow for separation of lower chamber 106 and filter assembly 102 in order to remove the used solids. More particularly, filter assembly 102 may mate with or otherwise engage the bottom of lower chamber 106 to provide an air tight seal, and, moreover, filter assembly 102 may hold paper filter 104 in-situ between lower chamber 106 and filter assembly 102.

Figure 4:
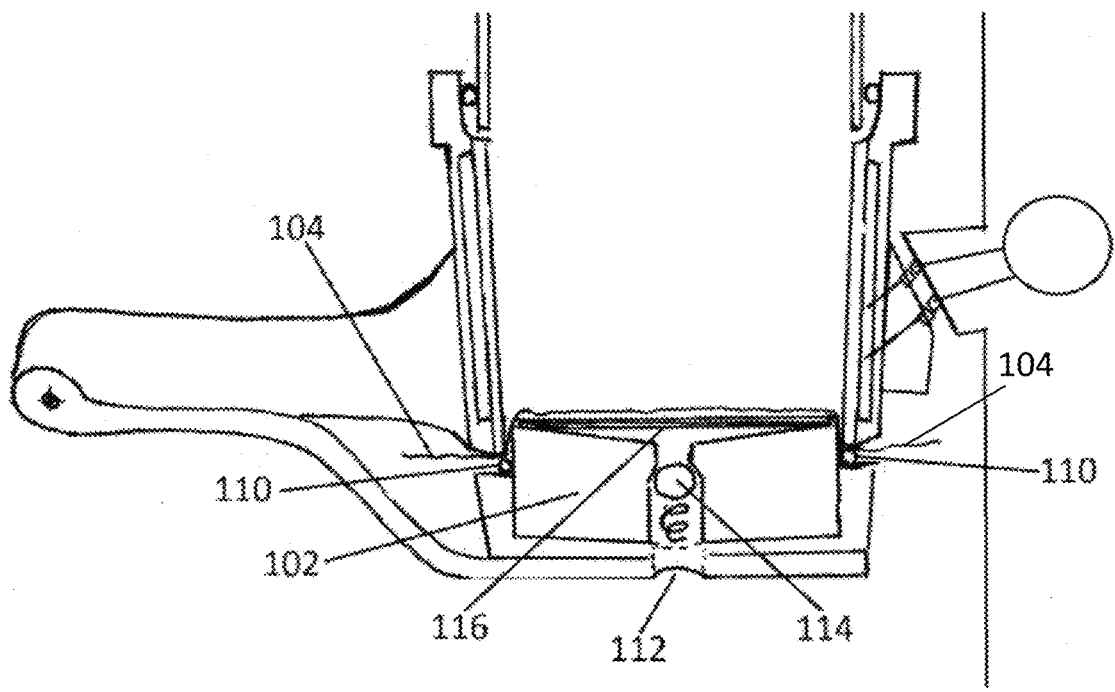
FIG. 4 is a schematic representation of another portion of a beverage brewing or infusing machine illustrating features of an embodiment of the invention.

Referring to FIG. 4, at the center of filter assembly 102 may be provided a drain hole 112, which drains to and through a one way valve 114. Above the drain hole 112 may be a metal mesh 116. The metal mesh 116 may keep the filter paper flat during the dispense cycle, and may protect particles of material from exiting the vessel if the paper filter is compromised. Additionally, the metal mesh 116 may act as a filter, such as in addition to or without use of the paper filter 104. Alternatively, metal mesh 116 may be a mesh comprised of plastic or other suitable material. A gasket 110 may be provided between filter assembly 102 and lower chamber 106 to allow for proper compression, that is, in order to maintain an airtight seal with or without the use of paper filter 104.

Those skilled in the pertinent arts may appreciate, in light of the discussion herein, that in order to brew or infuse consistently, the brew or infusion chamber may be regulated to a consistent temperature based on the product being brewed or infused. For example, in one embodiment, ensuring that the chamber and the liquid or consumable substance are at a correct, and consistent, temperature will ensure that the end product has the intended extraction. In another embodiment, the brew or infusion chamber may need to be maintained at a temperature sufficient to keep a liquid from solidifying, for example when the liquid comprises a fatty acid that is a solid at room temperature. Further, valves and flow meters that carry hot liquids, such as hot water, may be temperature regulated through the use of monitoring sensors, one or more temperature control units, and controllable heating elements, such as in order to stabilize and/or increase the temperature of the liquid as it travels to the brew or infusion chamber assembly 118. Further, valves and flow meters may be attached to a heated plate or may be independently wrapped with heat wire to regulate to the required temperature.

Referring again to FIG. 3, as discussed herein, the chamber assembly 118 may be separated into three primary assemblies. The upper chamber 101 communicates with the lower chamber 106, which in turn communicates with the filter assembly 102. In one embodiment, at least one of the three primary assemblies of chamber assembly 118 may have a thermal heating element integrated into the walls of the assembly, and may also have a temperature sensor integrated into the assembly for measuring the temperature of the heating element and/or the contents of the assembly, i.e., the infusing material and/or consumable substance. For example, the lower chamber 106 may comprise an inner wall 122, which is comprised of material conducive to efficient heat transfer, such as aluminum, and an outer wall 124, which may comprise an insulating material. Between inner wall 122 and outer wall 124 may be integrated a heater core 120 that serves to heat the contents of lower chamber 106.

It will be further appreciated that the height (and volume) of the disclosed design allows for a range of cup or vessel sizes. By way of non-limiting example, means to regulate volume depth may be provided by a proximity sensor or other method to measure range or distance of the liquid mass to the top of the brewing or infusing vessel. The depth of the vacuum may expand the consumable substance and infusion material inside the chamber, raising the level of the surface. Once the proximity sensor detects a specific height of the surface, the vacuum is then regulated via the one or more valves. Further, means to regulate volume depth may be via monitoring liquid or consumable substance mass temperature. That is, as atmospheres are removed, temperature is reduced. Therefore, temperature is correlated to control of the time and depth of atmospheric removal.

With reference now to FIGS. 1A and 1B, the vessel 18, the lower chamber 106, and the upper chamber 101 could be in the form of a glass vessel. High temperature tempered glass with properties such as that sold under the PYREX trademark would be most suitable for the invention due to the temperature resistance, transparency and the chemical resistance. The transparency of the glass allows for one to visually inspect the process during the brewing/infusing cycle, while also allowing for a visual/theatrical element which allows not just the operator but the audience/customer an opportunity to see the process to completion. The chemical resistance of the glass is required to ensure that the vessel can be washed after each use without retaining any oils or flavors from the previous brew or infusion cycle, so as not to contaminate the beverage or consumable substance. This lack of residual flavors from previous cycles gives the process the ability, for example, to brew both coffee and tea without contaminating the taste of the beverages.

The process and apparatus may use an energy source 27 which may create light or heat or both, during the brewing/infusing cycle. Adding light above, below or behind the vessel while brewing or infusing creates an illumination of the contents of the vessel. The light allows the operator to inspect and the audience to observe the movement of the liquid, i.e., consumable substance, and the infusion material during the brewing/infusing process. This light may also provide necessary heat to help maintain the desired temperature during the brewing/infusing cycle. The heat may be transmitted to the vessel 18, the lower chamber 106, or the upper chamber 101, and the consumable substance 19 in order to offset the temperature loss of the consumable substance when the initial vacuum is evacuated. This heat may be required in order to maintain the proper temperature range of the consumable substance during the process. It should be appreciated that any type of attached or integrated heat source, as would be understood by those skilled in the art, may be used to heat the consumable substance either in the brewing or infusing chamber, in a reservoir or supply container prior to placing the consumable substance into the brewing or infusing chamber, or both.

In one embodiment, the consumable substance is heated, either prior to its addition to the brewing or infusing vessel, while in the brewing or infusing vessel, or both before and after being added to the brewing or infusing vessel. Depending on the type of beverage or consumable substance being brewed or infused, the consumable substance may be heated in the range of about 150° F.-250° F., and preferably between 175° F.-212° F. In other embodiments, the consumable substance may be heated within lower temperature ranges, such as between 75° F.-175° F. In other embodiments, the consumable substance may be heated to higher temperature ranges, for example 250° F.-350° F., for example when the consumable substance comprises an oil or fatty acid. It should be appreciated that the present invention is not limited to any particular brewing or infusing temperature, so long as the process achieves the extraction of the desired liquids or solids to achieve the desired flavor of beverage or infused consumable substance. It should be appreciated that the present invention is suitable for brewing or infusing under a controlled vacuum pressure below room temperature, at about room temperature, or above room temperature.

In another embodiment, a "cold brewing/infusing" process achieves the proper extraction of the infusion material via a prolonged brew/infuse time at approximately room temperature while under a controlled vacuum pressure and/or multiple vacuum cycles. As previously noted, cold brewing or infusing processes in the prior art typically require long brew or infusion times in the range of 12-24 h. The cold brewing or infusion process of the present invention can significantly reduce the time for brewing or infusing at or below room temperature through the use of reduced pressure and/or vacuum cycles. For example, the cold brewing/infusing process of the present invention can achieve the proper extraction of the infusion material in a range for brew time of 1 min. to 12 hours, and more preferably within a range of 0.5 to 5 hours. A person skilled in the art would recognize that the reduced cold brewing or infusing process time afforded by the methods of the present invention makes a cold brewing/infusing process more appealing to consumers, while also improving the feasibility and/or efficiency of implementing a cold brewing/infusing process on larger scale, i.e., for commercial production using a cold brewing/infusing process.

Additionally, the cold brewing/infusing process of the present invention may also provide the benefit of sanitary, i.e., aseptic or sterile, brewing or infusing because the process is carried out in a sealed vessel under vacuum. The cold brewing/infusing process of the present invention can reduce or eliminate the introduction of microbes into the beverage or consumable substance during the brewing process because the brewing/infusing chamber, as described herein, is sealed from the surrounding environment during brewing or infusing. The cold brewing/infusing process of the present invention can also reduce or eliminate microbial growth during the brewing/infusing process because the process involves the removal of air via vacuum during brewing/infusing. A person skilled in the art would recognize that most spoilage microorganisms are aerobic, and thus the removal of air during the brewing/infusing process would inhibit microbial growth.

The hot or heated consumable substance process requires that the temperature range be maintained within the necessary range throughout the brewing/infusion process in order to properly extract the desired infusion material. Temperature loss of the hot consumable substance can occur when a vacuum is created within the chamber 3, when the water or consumable substance begins to boil below temperature and the water or consumable substance vapors are removed. At standard atmospheric pressure, water boils at 212° F. However, a "boiling" effect occurs when the vacuum decreases air pressure above the liquid water, thus allowing the water to become unstable and "boil" although under 212° F. As would be understood by a person skilled in the art, the temperature range of the brewing or infusion process can be optimized depending on the composition of the consumable substance.

The cooler the temperature of the water or consumable substance, the deeper the vacuum needs to be in order to achieve the "boiling" action. Rather than continuously pull a deep vacuum to maintain the "boiling" action of the consumable substance throughout the process in order to cool and rapidly remove the water or consumable substance vapors from their "foodstuff" as done in the Smaltz's and Larson's processes described above, the process of the present invention is designed to regulate the amount and duration of negative pressure, within the optimal range of vacuum pressures at about −5 to −20 Hg in (inches of mercury) throughout the brewing/infusing process. However, in exemplary embodiments of the present invention, sufficient brewing/infusing pressures may also be regulated within a range of about −1 to −5 Hg in, or at pressures between −20 to −29.9 Hg in.

In embodiments of the present invention where a hot or heated consumable substance is used, the regulation of negative pressure is necessary to allow the hot or heated consumable substance to boil at the start of the brewing/infusing process in order to start the release of gasses from within the dried media or other infusion material. The "boiling" action in the hot consumable substance occurs once the vacuum enters the necessary range. This "boiling" action would slow or stop because of temperature loss if the vacuum is not increased, i.e., deepened, in relation to the temperature loss. The release of gasses is created as a result of the pores of the dried media or other infusion material opening up while under the regulated vacuum, allowing liquid to displace the gasses inside the pores of the dried media/infusion material and resulting in the gasses rising to the surface. This release of gasses continues the agitation and movement of the consumable substance and dried media/infusion material, throughout the remainder of the brewing/infusing cycle, which is important for the brewing/infusing process.

In one embodiment, the release of gasses as described herein may eliminate the need to use a deepening vacuum pressure to maintain the movement of the consumable substance throughout the brew/infuse cycle, therefore minimizing temperature and vapor loss, thus allowing the consumable substance and infusion material to stay within the desired temperature range. As pointed out above, a source of energy 27 may also be used, and may provide heat to offset or minimize temperature losses during the brewing/infusing process and to provide light to add a visual aid and or theatrical element to the process, or both.

In an embodiment of the present invention, a liquid distributed into the brewing/infusing chamber may be delivered through a spray, wherein the spray means may allow for the flow of liquid to be separated into a plurality of streams which may benefit specific brewing/infusing media. The streams may also include the addition of gasses to the delivered stream of liquid. The adding of gasses to the liquid mixture while the desired liquid volume comes in contact with the brewing/infusing media and liquid mass may provide increased turbulence. The addition of gasses may also allow for the expansion of the overall volume of the consumable substance and infusion material, and for further increases during the vacuum cycle. In a preferred embodiment, a gas may be introduced in an even manner and/or by saturating the brewing/infusing media prior to an atmosphere removal cycle.

The temperature of the liquid for the hot or heated consumable substance process may be achieved and maintained by numerous available methods. Methods for heating the consumable substance to the desired temperature may include, but are not limited to, available mechanisms such as hot or heated water or consumable substance holding tanks, as seen in conventional commercial brewing equipment or hot water or consumable substance on demand heat exchange systems, similar to those utilized commercially and in homes which replace traditional hot water heaters. Referring to FIG. 1A, a modified version of the "hot water on demand" system 5 may be used with a variable volume regulating valve 9 (similar to omega.com #FLV400) in order to decrease or increase the contact time of the consumable substance while passing throughout the heat exchanger/block. Such control of contact time would allow the operator to change the exact temperature of each specific brewing/infusing cycle for the specific ideal temperatures that the tea, coffee, or consumable substance might need to create the best final product. A thermistor 8 may be used to read the temperature of the consumable substance exiting the heat exchanger, therefore sending the information to the "PLC" 16 or digital control system, which may increase of decrease the flow of the consumable substance through the heat exchanger in order to regulate to the desired temperature. Whereas, the more traditional hot water or consumable substance holding/heating tanks 5 may achieve the regulation of temperature using available means such as, but not limited to, gas mechanical thermostats or thermocouples 6 in communication with the control unit 16.

The inventive process also requires that there be a means of evacuating the atmosphere from the brew/infusion chamber 3. The process requires that the evacuation of atmosphere is achieved quickly, therefore such available mechanisms as vacuum pumps 1 and a venturi vacuum may be utilized to achieve evacuation in the required time. The preferred apparatus is a vacuum pump 1, purchased from KNF. This pump may be located internally or externally of a housing for the machine depending on mechanical configurations.

The vacuum system may be controlled by a central control unit, such as a PLC 16, or may be controlled with more conventional methods such as timers and relays. The negative pressure may be, but is not limited to, regulated with the use of a mechanical vacuum switch 12 which activates a means of stopping the evacuation, by deactivating the pump or closing a valve, when the desired set point of negative pressure is attained. In the event that there is a leak and pressure inside the chamber rises above the set limit. The vacuum pump may operate in conjunction with electrically controlled valves 10 to avoid starting and stopping the pump if needed to maintain proper pressure during the cycle. A vacuum gauge 14, visible to the operator, can be used to show the pressure within the chamber 3.

The basic mechanical functions of all process parameters can be controlled individually through low tech available mechanisms such as timers, thermostats, relays and mechanical switches and buttons. However, the system may be automated by controlling process parameters through the use of a central control unit such as a PLC 16 (programmable logic controller) with external visual displays 17 and buttons. The central control unit can allow for greater accuracy with each process parameter. In addition to the basic control of process parameters, the central control unit can add the capability to allow for the creation of specific brewing/infusing parameters or "recipes" for individual coffees, teas, herbs, or other consumable products. This may allow the user to program a specific name of the product to be brewed or infused and the exact parameters such as, but not limited to, water or consumable substance temperature, vacuum pressure, brew or infusion time, hold times, and volumes.

The Central control unit may also allow the apparatus to be linked into a network via, Ethernet or Wi Fi. This connectivity may allow access via the local network or remote access to data such as a variety of accounting information, error codes, service alerts, as well as the ability to change or alter standard system process parameters and add or edit "Recipes".

As should be readily apparent from the forgoing, the apparatus described above is used in the following manner. The desired amount of ground coffee, tea, herbs, fruit or other infusion material is placed in the chamber 3 of the glass vessel 18. The vessel is then placed on the moveable table top 24 while it is in its lowered position. The table top is then elevated until the upper edge of the vessel 18 seals against the top 15. Once the top is sealed, the desired amount of hot consumable substance, for example, water in a temperature range of about 185°-212° F., is introduced into the chamber 3 through the port 20. In lieu of introducing hot consumable substance into the chamber, it is also possible to provide an arrangement wherein cold consumable substance is used and the combined consumable substance and brewing/infusing material are then heated to the desired temperature while in the chamber 3. In one embodiment, a consumable material that is a solid at or below room temperature, for example butter, coconut oil, and the like, can be added to chamber 3, then heated to liquefy the material. Thereafter, a vacuum is drawn in the chamber 3 by activating valve 10 and/or turning on vacuum pump 1 which also communicates with the chamber 3 through port 20.

The vacuum within the chamber 3 is held within a range of about −2 to −20 Hg in, preferably within the optimal range of about −5 to −20 Hg in. Using the energy source 27 or some other external heat source, the consumable substance within the chamber 3 is maintained at the desired temperature of about 185°-212° F. Alternatively, it has been found that good results are achieved if the vacuum is pulsed or cycled. That is, after the infusion material is mixed with the consumable substance, it is put under a vacuum for a desired time period, such as for about 5 seconds, and then brought back to atmospheric pressure for approximately 30 to 60 seconds. The vacuum is then reapplied for about another 5 seconds. The values listed above for the number or duration of vacuum pulses are by way of example only, as the process is not limited to these on/off times or to the number of pulses that may be applied during each brewing or infusing cycle. For example, in various embodiments of the present invention, the number of vacuum pulses or cycles can be 1 or more than 1, such as at least 2, 3, 4, 5, etc. Similarly, the value for the duration of vacuum application can be more or less than 5 seconds, such as 1, 2, 3, 4, 6, 7, 8, 9, 10, 12, 15, 20, etc. Likewise, the value for the duration of time that the system is maintained at approximately atmospheric pressure, i.e., between applications of vacuum, can be less than 30 seconds, more than 60 seconds or somewhere between 30 and 60 seconds, such as 5, 10, 25, 75, etc. As should be readily apparent, the Central control unit can be used to control the brewing or infusing cycle and the number and duration of pulses as desired.

In one embodiment of the present invention, the magnitude of each vacuum cycle in a series of vacuum cycles may be different than the previous cycle. For example, each vacuum cycle in a series of vacuum cycles may be deeper than the previous cycle, i.e., the vacuum becomes progressively deeper with each successive cycle. Utilizing different vacuum depths at different points in the brew/infusion process can be beneficial to the brewing/infusing extraction. For instance, after each vacuum cycle, the consumable substance may cool, requiring the next vacuum cycle to be deeper than the previous cycle in order to maintain the same level of "boiling action" or extraction activity from cycle to cycle. By way of a non-limiting example, in the first cycle in a brew/infusion process the vacuum applied is about −5 Hg in. In the second cycle, the vacuum applied is about −7 Hg in. In the third cycle, the vacuum applied is about −9 Hg in, and so on, i.e., the vacuum is deepened with each successive cycle. Alternatively, the vacuum may be decreased, i.e., weakened, with each consecutive cycle, or may be increased or decreased with every other cycle. In various embodiments, the magnitude of vacuum applied for each consecutive cycle may change throughout the brew/infusion process, and can be higher, lower, or the same as the previous cycle. Accordingly, such changes in vacuum magnitude may be programmed to follow any pattern from cycle to cycle, as may be contemplated by one with reasonable skill in the art.

By way of non-limiting example only, brewing certain teas with the brewing cycle described above may take approximately 20-60 seconds. The cycling between negative and atmospheric pressure during such a period of time may allow for desirable soluble elements, such as sugars and polyphenols (antioxidants), to be extracted from the tea without using extraction aids, and may limit the extraction of undesirable elements, such as tannins, into the brewed result, for example. For example, Jade Cloud, a Japanese tea variety, is traditionally brewed at about 180° F. for about 180-240 seconds, but using the present invention allows for brewing at about 195° F. for about 65 seconds. An Iron Goddess of Mercy, for example, is traditionally brewed at about 195° F. for about 140-180 seconds, but using the present invention allows for brewing at 207° F. for about 65 seconds. Similarly, a Bai Hao Oolong, for example, is traditionally brewed at about 190° F. about for 35-120 seconds, but using the present invention allows for brewing at about 207° F. for about 65 seconds.

By way of further example, a Wuyi Oolong is traditionally brewed at about 200° F. for about 240 seconds, while using the present invention allows for brewing at about 207° F. for about 65 seconds. Further, a Golden Yunnan Organic, for example, is traditionally brewed at about 212° F. for about 240-300 seconds, while using the present invention allows for brewing at about 207° F. for about 65 seconds. Similarly, an Ancient Shu Pu-erh (vintage 2009), for example, is traditionally brewed at about 212° F. for about 180-240 seconds, while using the present invention allows for brewing at about 207° F. for about 88 seconds (which includes a pre-rinse of the tea). A Blueberry Rooibos, for example, is traditionally brewed at about 195° F. for about 300-420 seconds, while using the present invention allows for brewing at about 207° F. for about 65 seconds (which includes a pre-rinse of the tea). Of course, this and all embodiments herein may be used with cold brewing methods and known to those skilled in the art and as described herein.

The examples above indicate the typical difficulties of certain ingredients requiring long brewing/infusing times that are likely to arise in a commercial setting. In addition to more optimal extraction of soluble materials into the consumable substance, as discussed above, the present invention allows for commercially reasonable brewing/infusing cycle times, as well as providing increased product consistency (given the low variability in brew time), which is remedial for the aforementioned typical difficulties that arise from brewing/infusing in commercial settings—especially for high volume restaurants and coffee houses, for example. As will be discussed further herein, these advantages are also desirable in the home-use market.

In addition to commercial uses, the present invention may allow for a home or personal brewing/infusing device. Present day devices are either very convenient to use but provide a low quality of brewing, or offer a very good brewing process but at the cost of convenience to the consumer. The present invention provides both convenience (via at least the very short brew times) with unmatched quality and consistency (via at least the brewing/infusing process described above).

The descriptions and examples of the methods of the present invention previously discussed herein are generally directed to brewing coffee and tea or infusing a liquid to create a beverage. In other embodiments, the device and methods described herein are useful for infusing a consumable substance with a spice, herb, botanical, vegetable, fruit, or other infusion material to create an infused consumable product other than a beverage. In such embodiments, the liquid or consumable substance to be infused can be an oil, for example a vegetable or cooking oil such as olive oil, canola oil, grape seed oil, sesame oil, a nut oil, or a citrus oil; an animal-derived oil, such as a fish oil; a fat, such as butter or lard; a wax; any type of vinegar; honey; or any other liquid suitable for use in a consumable product. The consumable substance can be a material that is a solid at room temperature, or even significantly above room temperature, but that is readily liquefied upon heating. Alternatively, the consumable substance can be a solid that does not readily liquefy upon heating, such as any type of meat or fat. Further, the consumable substance to be infused can be a mixture of solid and liquid materials, for example, any type of emulsion, sauce, marinade, or dressing. However, the consumable substance to be infused is not limited to the specific materials cited herein, and can comprise any edible material. Further, the infusion material can be any material useful for imparting a flavor to another material, as previously defined herein.

It is contemplated herein that the conditions of the infusion process of the present invention may be appreciably different than the conditions for the embodiments related to beverage brewing described elsewhere herein. For example, when the liquid or food product is an oil or a fat, higher temperatures and/or deeper vacuum may be used to obtain the same level of infusion, i.e., optimal extraction of the infusion material into the consumable substance, compared to a beverage brewing process using water as a liquid. Further, the conditions of the infusion process can be modified based on various characteristics of the consumable substance, for example, but not limited to, the viscosity, porosity, vapor pressure, or pH of the consumable substance.

In one embodiment of the present invention, the addition of the consumable substance and vacuum cycle may occur at substantially the same time. Although atmosphere removal may typically occur after the desired volume has been added to the brew mass, as the volume of desired consumable substance is added to the chamber, the vacuum may be allowed to build in the present invention. Such a technique may allow for reduced overall brewing/infusing process time, lower temperatures as the desired consumable substance enters the chamber, and removal of unwanted gasses from the infusion material, all while adding the desired amount of consumable substance.

Similarly, in an embodiment of the present invention, vacuum cycles may alternate, such as to allow for a partial filling of the chamber with the consumable substance, the application of a vacuum cycle, and a second or further addition of remaining consumable substance(s), additional consumable substance s, or the like. As will be appreciated by those skilled in the art, the cycles can be repeated to allow for as many alternating cycles as desired, and may include, or not include, a vacuum draw per cycle. Likewise, vacuum cycles may be provided at alternate vacuums per cycle. For example, with regard to a series of three cycles having only a single vacuum cycle, the percentage of total consumable substance added before the vacuum cycle may be a function of the amount and type of the infusion material. The remaining amount of consumable substance which will be added after the vacuum process may be similarly dependent.

Cycling in this manner may force down the infusion material on the surface of the consumable substance present, adding to the amount of agitation of the infusion material. Further, and more particular to media such as coffee, for example, as the atmosphere is removed, an infusion material may release compounds and gases. For example, coffee may expel $CO_2$ during atmosphere removal, which may result in the water and media mixture expanding higher in the brewing/infusing chamber, allowing for greater agitation and increased brewing or infusion.

Furthermore, the consumable substance added after the vacuum is released may provide for an increase in extraction of compounds from the media, i.e., infusion material. This can occur through the raising of the brewing/infusing mass temperature, the lowering of soluble concentrations (providing an increased potential from equilibrium), and thus may allow more solubles to be extracted, thereby forcing the infusion material which may be at the surface of the consumable substance down into the mass, and thereby increasing the agitation which occurs upon delivery of the additional consumable substance.

Furthermore, the addition of consumable substance to the system, and more specifically, after a vacuum cycle, may help rinse suspended infusion material, resulting from the expansion of the consumable substance and media during atmosphere removal, from the inner chamber walls after the at least partially applied vacuum is released and as the chamber equalizes with ambient pressure. After such cycling, it is preferable that at least a majority of material remaining in the chamber should be removed from the chamber walls to ensure that the subsequent batch is not contaminated by material from the previous batch. For example, the present invention may also provide a stream of water or liquid which may be sprayed onto the interior chamber walls to rinse down the material, i.e., a liquid rinse cycle. This liquid rinse cycle may be applied before, during, or after a brewing/infusing cycle, such that residual infusion material located on the chamber walls may be substantially removed from the walls and/or redirected to another part of the system.

In an embodiment of the present invention, the amount of time before a vacuum is applied may vary based upon the infusion material and may affect the amount of compounds released by the media. For example, a hold time of an additional 2-50 seconds, and more particularly such as 20 seconds, prior to the application of a vacuum cycle may allow for the release of flavor elements not otherwise released between the cycles.

Similarly, reducing the atmosphere of the chamber prior to the addition of the consumable substance, or at least a substantial portion of the consumable substance, may increase the rate at which the consumable substance is infused. For example, lowering the pressure prior to introducing the consumable substance may remove unwanted gas(es) from the infusion material, which may allow subsequent vacuum cycles, for example, to perform better extraction.

In an embodiment of the present invention, a water rinse cycle may precede any brewing or infusing cycles if, for example, the infusion material requires a rinse to wash unwanted components out of the infusion material prior to the brewing/infusing cycle(s). More specifically, certain media may require a pre-brew cycle rinse/brew be used in order to wash off undesirable taste elements. This process may consist of adding desired water volume, and additionally of one or more of the following steps: holding at atmospheric pressures for desired time; removing desired atmospheres for a desired time; separating the water from the infusion material so that the material is free from the liquid; and disposing of the pre-brew liquid. Then the unit may be prepared for a full brew/infusion cycle.

In an embodiment of the present invention, once the vacuum brewing/infusing process is complete, the infusion material may be separated by means of passing the liquid through a thin mesh or paper filter in order to separate the liquid from the remaining infusion material. The separation may require adequate pressure to push the liquid through the remaining undissolved material and the filter to a one-way valve opening, for example. During this separation, a means of pulsing of positive pressure may be utilized. For example, positive high and low pressure settings may create pressure variation, which may increase and release pressure on the material, thereby adding additional extraction to the brewing/infusing process after vacuum brewing/infusion has occurred. Positive pressure may be applied in various ways, as would be understood by a person with reasonable skill in the art. For example, positive pressure could be created by supplying a gas, such as air, carbon dioxide or nitrogen, to the chamber or vessel of the present invention. In one exemplary embodiment, the positive pressure applied should sufficiently separate the liquid from the remaining solid infusion material. For example, the applied pressure may be between 1-10 psig, or in another example, the applied pressure may be greater than 10 psig.

In other embodiments, the methods and apparatus described herein may be used with a pre-packaged pod-type delivery system, such as a KEURIG brewing system or the like, or with pre-packaged beverage pods, such as K-CUP packs or the like. Generally, in such brewing systems, a single serving of beverage is brewed by passing hot water through a container that has been pre-packaged with brew material and a filter. In one embodiment of the present invention, a person with reasonable skill in the art could modify the apparatus of the present invention to use pre-packaged beverage or infusion material pods, instead of using loose brewing or infusion material in the brewing/infusing chamber, in order to perform the methods of the present invention. In another embodiment, a person with reasonable skill in the art could modify a pre-packaged pod-type delivery apparatus to perform the methods of the present invention, for instance, by modifying the apparatus to apply negative or positive pressure to the pre-packaged beverage or infusion material pods used in the apparatus and/or by modifying the pre-packaged beverage or infusion material pods to accommodate changes in pressure or temperature.

In an embodiment of the present invention, in order to create an optimal product free of insoluble materials with specific infusion material with fine particles, a new one of the paper like filters may be used for each cycle. Upon completion of the brewing/infusing process, the paper and the remaining undissolved elements may be removed and discarded. This process may be performed manually or may be automated.

Figure 2:
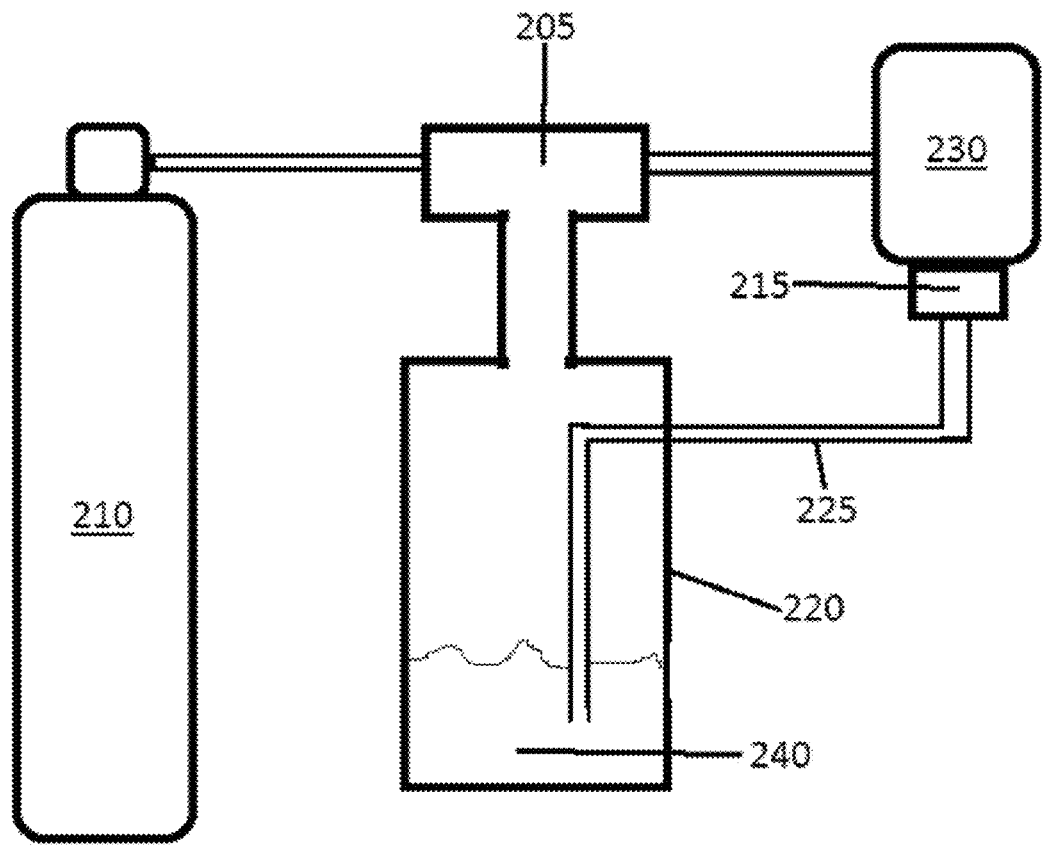
FIG. 2 is a schematic representation of a portion of a beverage brewing or infusing machine illustrating features of an embodiment of the invention.

FIG. 2 is a schematic system diagram illustrating an infusion system in accordance with the present invention. As illustrated, the system may infuse a beverage or consumable substance with compounds from fruits, botanicals, and/or other food-safe desirable additives. In an embodiment of the present invention, an at least partial vacuum may be created within canister 220 through valve 205. In addition to using a vacuum pump as described above, the present invention may utilize other principles, such as venturi principles, to effect a pressure change on canister 220. As illustrated in FIG. 2, a gas such as $CO_2$ may flow from tank 210 through valve 205, which may be venturi orientated, into tank 230, producing at least a partial vacuum in canister 220 when valve 215 is at least partially closed. Such a closed system may allow for greater control of the vacuum created and may allow for the conservation of gases used in the system.

Cycling of vacuum pressure may be controlled by valve 205 and/or optional valve 215. If, for example, $CO_2$ is the gas used, as the vacuum builds the return of the gas into canister 220 through tube 225 may allow for a releasing of the vacuum and/or greater infusion of the material and liquid mixture 240. Further, the vacuum may be sufficiently reduced so as to allow for the incorporation of a gas through tube 225 into the mixture 240. Using $CO_2$ as the example, the present invention may allow for the production of a carbonated beverage by infusing the mixture 240 with the $CO_2$.

As discussed herein, a brewing/infusing process utilizing this embodiment of the present invention may be used to infuse water, spirits, or consumable substances generally, such as by infusion with natural extracts from fresh or dried fruit. By way of non-limiting example, fruit (fresh or dried) may be placed in a canister 220 wherein water may be added. A vacuum may then be applied to the solution containing the water and fruit material—a cycling process which may be repeated to enhance the extraction and such as is discussed herein. The infused product may be dispensed through the following ways, by way of non-limiting example: directly after the required vacuum cycles are complete, $CO_2$ is added to the infused liquid; after the required vacuum cycles are complete, additional water is added to the infused solution; and/or the initial infusion water has a higher temperature to thus increase the infusion process, while the secondary water may be delivered at an ice-cold temperature to chill the beverage and reduce the temperature for delivery. Further, for example, at any point in the processes discussed herein, such as after the additional water is added to an infused liquid, the product may be carbonated.

Further, in an embodiment of the present invention and as referenced above, spirits, or other consumable material, may be introduced into the brewed/infused mixture during processing and/or for infusion. For example, the present invention may allow for the infusion of spirits (for example, vodka) with natural extracts from fresh or dried fruit. By way of non-limiting example only, fruit (fresh or dried) may be placed in a sealable environment (canister 240) along with an alcoholic liquid. The environment may be sealed and a vacuum applied to the solution containing the alcoholic liquid and fruit material—and the vacuum may be repeated/cycled to enhance the extraction. The post-brewing/infusing process may be combined with the immediate application of a chilling device or methods to immediately reduce the temperature of the solution, such as the application of ice or an instant chiller sleeve and/or another chilling environment.

Similarly, spirits may be added in a brewing/infusing process in order to infuse a consumable substance. For example, a spirit may be infused, such as during or following a vacuum cycled brewing/infusing process, into, for example, a tea or coffee brew. In various embodiments of the present invention, spirits may be infused into a beverage such that the final product is at least 2% alcohol, i.e., ethanol, by volume. For example, in one embodiment, beer comprising about 2-12% alcohol by volume (ABV) may be infused. In another embodiment, wines, typically comprising 9-16% ABV, may be infused. In another embodiment, liqueurs, typically comprising 15-55% ABV, may be infused. In yet another embodiment, other spirits, such as rum, brandy, or grain alcohol, with alcohol content of 60% ABV or higher, may be infused.

After the coffee, tea or other consumable substance has brewed or been infused for the desired amount of time, the heat and vacuum are turned off and the chamber is returned to atmospheric pressure. The table top 24 is then lowered to release the vessel 18. The contents of the chamber can then be strained by any traditional means such as by using French press screens or paper filters.

The separation of liquid and media may also occur as an automated step in the process. This process would occur once the brewing/infusion is complete and the vacuum is released. The pump 1 could then activate and, through proper valving, pressurize the chamber, forcing the liquid through a screen below the coffee grounds or other media and out a one way valve in the bottom of the chamber. Such a step would, of course, require a modified chamber that includes a one way valve in the center of the base and a screen to cover the inside bottom of the vessel in order to separate the solid media from the liquid during the dispensing process.

There are numerous alternative embodiments for the cycling discussed above, such as the amount of consumable substance used, and the amount of vacuum applied (which may vary by amount and/or type of material to be brewed/infused). For example, coffee may be brewed using just a single vacuum cycle, but may be brewed with more than one water-additive cycle. For example, regardless of the number of cycles, the volume of water used may be less than the amount used in the finished product. Enough water may be employed to effectively brew the selected material with water added to the final beverage after the brewing process is completed. For example, four (4) ounces of water may be used in the vacuum brewing process for coffee, while an additional eight (8) ounces of water may be added to the brewed product to create a final twelve (12) ounces of coffee. Thereby, an espresso may be optionally provided, or a coffee, or a cappuccino (such as wherein espresso may be initially brewed, followed by a brew with milk). In short, the amount of water used during the at least one vacuum cycle may vary and is dependent upon the amount of material being brewed and/or the desired strength of the final product (although the addition of water may be used to control the concentration of the final product).

As discussed above, the brewing/infusing cycle of the present invention may allow for brewing times approximately one-fifth of standard brewing times. Such a reduction in time may allow for the brewing/infusing of commercial offerings that would otherwise have an undesirable brewing time or that typically cannot be satisfactorily brewed in a practical manner. For example, the increase in sugar extraction and reduction in tannin extraction by the present invention over traditional brewing/infusing methods, as described above, may allow a consumer of the brewed beverage or product to limit or exclude any addition sweetener(s) that would otherwise be necessary to mask the taste of tannins and/or supplement the amount of sugars in the beverage. Thus, beverages or products brewed or infused using the present invention may, if packaged as an end product, such as a bottled iced tea, contain less added sweetener(s) and/or less calories, and/or may maintain taste and quality without need of sweeteners or other additives.

In addition, using bottled iced tea as an example, the present invention may allow for the production of bottled teas which contain about nine (9) times more polyphenols than standard commercially sold bottled teas. In short, the present invention may allow for a bottled tea which has reduced tannins, higher levels of natural sugars and antioxidants, while offering a greater array of tea choices. For example, a local café may brew and bottle iced teas for sale in their establishment and/or for sale to other local vendors.

Although these may be produced at anytime, given the short brewing/infusing times discussed above, employees of a commercial café who may be experiencing a slow down in foot traffic may engage in the brewing and bottling of beverages on-site (teas in this example). Such impromptu activity may allow the employee to become more effectively utilized and may allow for a targeted and efficient offering of packaged beverages. For example, the local café may be able to control production very closely given the near instantaneous evaluation of consumer demand based on prior sales, local weather, actual inventory and real-time consumption data, for example. Production control may include the shear volume of product produced and/or the type of product produced.

Further, such brewing process may be combined with various methods of commercial bottling and beverage stabilization that protects flavor and nutritional shelf life. For example, tea, herbs, and/or fruit (fresh or dried) may be placed in a sealable environment (canister, etc). Water may be added to the sealable environment that contains the fruit material. The brewing environment may be sealed and a vacuum may be applied to the solution containing the water and fruit material—this may be repeated to enhance the extraction.

Before the infused solution is dispensed, additional water, or other liquid, may be added to the infused solution. The initial infusion liquid or consumable substance may have a higher temperature to increase the infusion process, while the secondary addition of liquid or consumable substance may be delivered at a colder temperature to chill the beverage or product and reduce the temperature. For instance, the secondary addition of liquid may be delivered at a temperature in the range of 32°-50° F. Additives may also be used that protect flavor and nutritional shelf life of the beverage or product.

Given the brew/infusion times possible with the present invention, choices with regard to the type of beverages or products produced may be made with great efficiency and responsiveness to consumer demand, not only holding inventory at optimal levels, but also minimizing waste of unsold and expired product (expired product may be product older than 45 days, for example), especially when using very expensive starting materials, such as rare teas, for example. Where traditional methods have failed, the real-time "batch" production of the present invention enables production of cold-storage beverages at the point of sale and eliminates external ordering processes, delivery of goods, and maintenance of a remote production facility, for example.

Although many examples of tea and coffee brewing have been provided herein, the present invention may be used to brew any beverage where water, spirits, or any other consumable substance generally is used to extract certain bodies from a particular medium. For example, hops, barley and malt, alone or in combination, may be brewed and/or steeped for use alone or as a part of a beverage combination. The present invention may shorten the steep time often associated with processing hops, barley and/or malts for use in beverages, and may allow for improved extraction and flavor qualities over traditional processes. For example, traditional steeping times may range from 20 to 40 minutes at about 150° F. to about 170° F., for example, wherein the present invention may provide steeping in about 6 to 10 minutes at about 180° F. to about 220° F.

In an embodiment of the present invention, the regulation of vacuum cycles may be in direct relationship to the optimal extraction of coffee solubles of 18-22% of the total 30% of the solids available for targeting to be dissolved from given coffee matter (as defined by the Specialty Coffee Association of America and the Specialty Coffee Association of Europe). The extraction is measured through charting of the total dissolved solids, provided by testing the brewed beverage with a digital refractometer, and charting of the data in the use of the Brewing Control Chart, as used by the SCAA and SCAE. By way of example, the total dissolved solids of a brewed beverage may be analyzed using the methods and apparatus described in U.S. Pat. No. 7,952,697 issued to Fedele et al. (Coffee Refractometer Method and Apparatus).

For example, in an embodiment of the present invention, the optimal vacuum depth to utilize for hot brewing to obtain 18-22% extraction may be from 3-14 psig. Vacuum ranges and cycles with lower times and depth may result in sub 18% extraction ranges therefore resulting in a less than favorable extraction rate. However, vacuum ranges and cycles with higher times and depth may result in greater than 22% extraction which will result in a greater than favorable extraction rate.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A process for infusing a consumable substance, comprising:
   placing a desired amount of at least one infusion material into a chamber;
   placing a desired amount of a consumable substance into said chamber, wherein the consumable substance is a liquid;
   sealing said chamber from the surrounding atmosphere; and
   applying at least one pressure cycle within said chamber, wherein said at least one cycle comprises reducing pressure within said chamber to a first pressure while the chamber is sealed from the surrounding atmosphere, and subsequently adjusting pressure within said chamber to a second pressure.

2. The infusion process of claim 1, wherein said chamber is sealed from the surrounding atmosphere prior to placing the infusion material into said chamber, after placing the infusion material into said chamber, or after placing the consumable substance into said chamber.

3. The infusion process of claim 1, wherein the first pressure is in the range of about −2 to-about −29 inches of mercury.

4. The infusion process of claim 1, wherein the second pressure is atmospheric pressure.

5. The infusion process of claim 1, wherein the second pressure is in the range of about −2 to-about −29 inches of mercury.

6. The infusion process of claim 1, wherein the consumable substance is heated prior to placing the consumable substance into said chamber.

7. The infusion process of claim 1, wherein the consumable substance is heated after being placed in said chamber.

8. The infusion process of claim 1, wherein the consumable substance is maintained within a temperature range of about 70° F. to about 350° F. during said at least one pressure cycle.

9. The infusion process of claim 1, further comprising substantially separating said infused consumable substance from said infusion material.

10. The infusion process of claim 9, further comprising applying positive pressure to the chamber during the separation of said consumable substance from said infusion material.

11. The infusion process of claim 1, wherein said infusion material comprises fruit.

12. The infusion process of claim 1, wherein said infusion material comprises herbs or botanicals.

13. The infusion process of claim 1, wherein said consumable substance comprises a cooking oil.

14. The infusion process of claim 1, wherein said consumable substance comprises vinegar.

15. The infusion process of claim 1, wherein said consumable substance comprises a fat.

\* \* \* \* \*